United States Patent
Lee et al.

(10) Patent No.: US 7,561,419 B2
(45) Date of Patent: Jul. 14, 2009

(54) HANDHELD ELECTRONIC DEVICE

(75) Inventors: Chun-Shih Lee, Tao Yuan (TW);
Yu-Jing Liao, Tao Yuan (TW);
Ying-Yen Cheng, Tao Yuan (TW)

(73) Assignee: HTC Corporation, Taoyuan County (TW)

( * ) Notice: Subject to any disclaimer, the term of this patent is extended or adjusted under 35 U.S.C. 154(b) by 0 days.

(21) Appl. No.: 12/053,634

(22) Filed: Mar. 24, 2008

(65) Prior Publication Data
US 2009/0097193 A1    Apr. 16, 2009

(30) Foreign Application Priority Data
Oct. 16, 2007    (TW) .............................. 96138677 A

(51) Int. Cl.
*G06F 1/16* (2006.01)
*H05K 5/00* (2006.01)
*H05K 7/00* (2006.01)

(52) U.S. Cl. ............................ 361/679.58; 361/679.55; 361/679.56; 429/96; 429/100

(58) Field of Classification Search ................. 361/683, 361/679.55, 679.56, 679.58; 429/96–100
See application file for complete search history.

(56) References Cited

U.S. PATENT DOCUMENTS

| | | | | |
|---|---|---|---|---|
| 5,716,730 | A * | 2/1998 | Deguchi | 429/97 |
| 6,898,074 | B2 * | 5/2005 | Hsu et al. | 361/683 |
| 2004/0214077 | A1 * | 10/2004 | Huang | 429/97 |
| 2006/0166083 | A1 * | 7/2006 | Zhang et al. | 429/97 |
| 2006/0172183 | A1 * | 8/2006 | Chen et al. | 429/97 |
| 2006/0292439 | A1 * | 12/2006 | Zuo et al. | 429/97 |
| 2008/0076015 | A1 * | 3/2008 | Tien et al. | 429/100 |

* cited by examiner

*Primary Examiner*—Jayprakash N Gandhi
*Assistant Examiner*—Adrian S Wilson
(74) *Attorney, Agent, or Firm*—Jianq Chyun IP Office

(57) ABSTRACT

A handheld electronic device including a body, a cover, an engaging assembly, and a releasing member is provided. The cover is disposed on the body and has a hole. The engaging assembly is movably disposed between the body and the cover to engage the cover on the body. The releasing member is disposed on the body and exposed by the hole of the cover. The releasing member is suitable for leaning against the engaging assembly and driving the same from an engaging position to a releasing position so as to release the cover.

8 Claims, 4 Drawing Sheets

HANDHELD ELECTRONIC DEVICE

CROSS-REFERENCE TO RELATED APPLICATION

This application claims the priority benefit of Taiwan application serial no. 96138677, filed on Oct. 16, 2007. The entirety the above-mentioned patent application is hereby incorporated by reference herein and made a part of specification.

BACKGROUND OF THE INVENTION

1. Field of the Invention

The present invention generally relates to a handheld electronic device, in particular, to a handheld electronic device having a highly reliable and convenient design of cover disassembly.

2. Description of Related Art

A handheld electronic device is an electronic device which can be held and operated in a user's hand. A handheld electronic device is usually small-sized and light-weighted so that it can be carried anywhere by a user. Handheld electronic devices currently in use include mobile phones, multimedia players, personal digital assistants (PDAs), palmtop computers, palmtop game consoles, and handheld global positioning system (GPS) device etc.

On the other hand, in order to keep the portability of handheld electronic devices and increase the surface areas of the displays and keyboard thereof at the same time, handheld electronic devices having stacked bodies (for example, folding-type or sliding-type handheld electronic devices) have been developed besides bar-type handheld electronic devices.

Additionally, exchangeable batteries are usually adopted in handheld electronic devices in order to prolong the operation time thereof. A user can carry a backup battery and replace the battery in a handheld electronic device when necessary so as to prolong the operation time of the handheld electronic device.

In the design of a handheld electronic device, a battery cover is always used for protecting the battery. The battery cover on the handheld electronic device has to be disassembled first in order to exchange the battery and assembled back to the handheld electronic device after the battery has been exchanged. In a conventional design of a handheld electronic device, the battery cover is usually engaged to the body of the handheld electronic device through a clasp, wherein the clasp is directly connected to a push button on the outer surface of the handheld electronic device, and a user can push the push button to move the clasp and to release the engagement between the clasp and the battery cover and remove the battery cover from the body of the handheld electronic device. Foregoing operation is performed reversely to assemble the battery cover to the body of the handheld electronic device.

However, since the members of the handheld electronic device interact with each other directly in foregoing conventional design, these members may be worn off easily and accordingly the reliability may be reduced. Moreover, the tolerance may be increased during the interaction between the push button and the clasp due to the abrasion of these members such that the operation handle of the handheld electronic device is affected. Furthermore, the push button on the outer surface of the handheld electronic device makes the appearance of the handheld electronic device unsatisfactory.

SUMMARY OF THE INVENTION

Accordingly, the present invention is directed to a handheld electronic device, wherein a cover of the handheld electronic device can be disassembled and assembled conveniently so that the appearance and reliability of the handheld electronic device are both improved.

The present invention provides a handheld electronic device including a body, a cover, an engaging assembly, and a releasing member. The cover is disposed on the body and has a hole. The engaging assembly is movably disposed between the body and the cover for engaging the cover on the body. The releasing member is disposed on the body and exposed by the hole of the cover. The releasing member is suitable for leaning against the engaging assembly and driving the engaging assembly from an engaging position to a releasing position so as to release the cover.

In the handheld electronic device of the present invention, the engaging assembly is driven by a releasing assembly which leans against the engaging assembly so that the engagement between the engaging assembly and the cover can be released through simple interactions. Accordingly, the abrasion between various members of the handheld electronic device can be reduced and the engagement between the engaging assembly and the cover can be precisely controlled so that both the operation handle and the reliability of the handheld electronic device are improved. Moreover, because the releasing member is encapsulated and exposed by only a hole of the cover, the appearance of the handheld electronic device is improved. Battery exchange can be made more convenient if this design is applied to a battery cover of a handheld electronic device.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
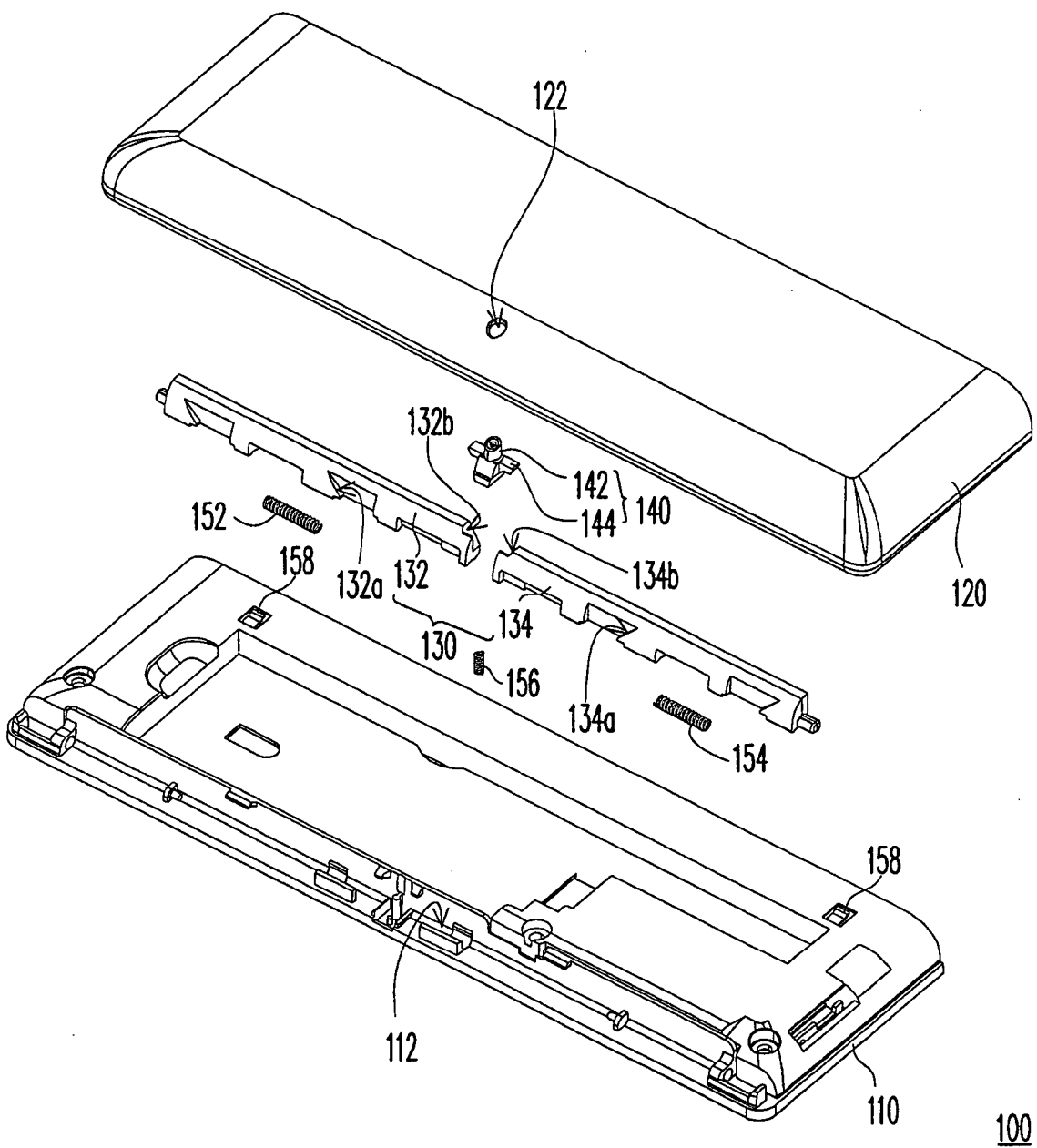
FIG. 1 is a partial perspective front view of a handheld electronic device according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

In the present invention, a body and a cover of a handheld electronic device are assembled or disassembled through the interaction between an engaging assembly and a releasing member. Since only simple members are adopted and these members interact by simply leaning against each other, the operation of the entire engagement structure can be precisely controlled and accordingly the reliability thereof can be improved.

To be specific, the present invention may be applied to a battery cover of a handheld electronic device. An engaging assembly composed of two engaging rods may be adopted and disposed at one side of the handheld electronic device, and a releasing member may be disposed between the two engaging rods for driving the engaging rods so as to release the battery cover. On the other hand, in order to control the interaction between related members precisely, the releasing member may have a wedge for leaning against the two engaging rods, and in order to allow the engaging rods and the releasing member to restore their original positions, elastic members may be adopted and disposed at appropriate positions.

The present invention will be explained below by taking a battery cover of a handheld electronic device as an example. However, the application of the present invention and the types and dispositions of related members are not limited thereto, and it should be understood by those skilled in the art that various changes in form and details may be made therein without departing from the spirit and scope of the present invention.

Figure 2:
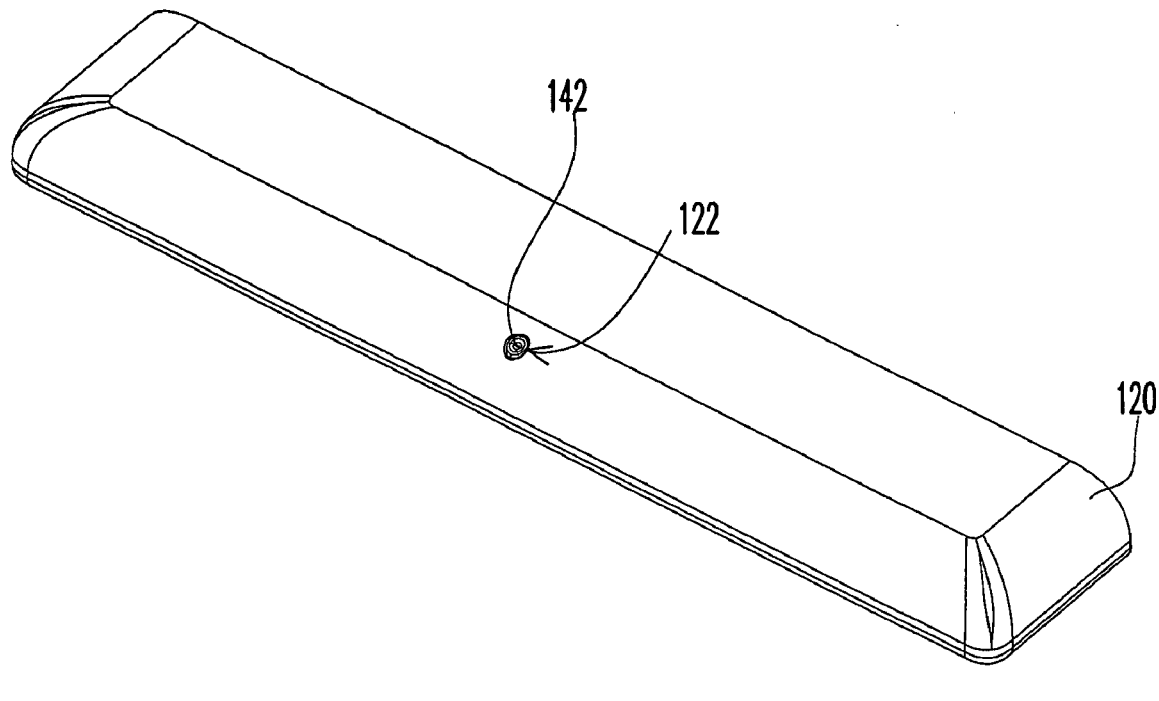
FIG. 2 is an exploded view of the handheld electronic device in FIG. 1.
Figure 3:
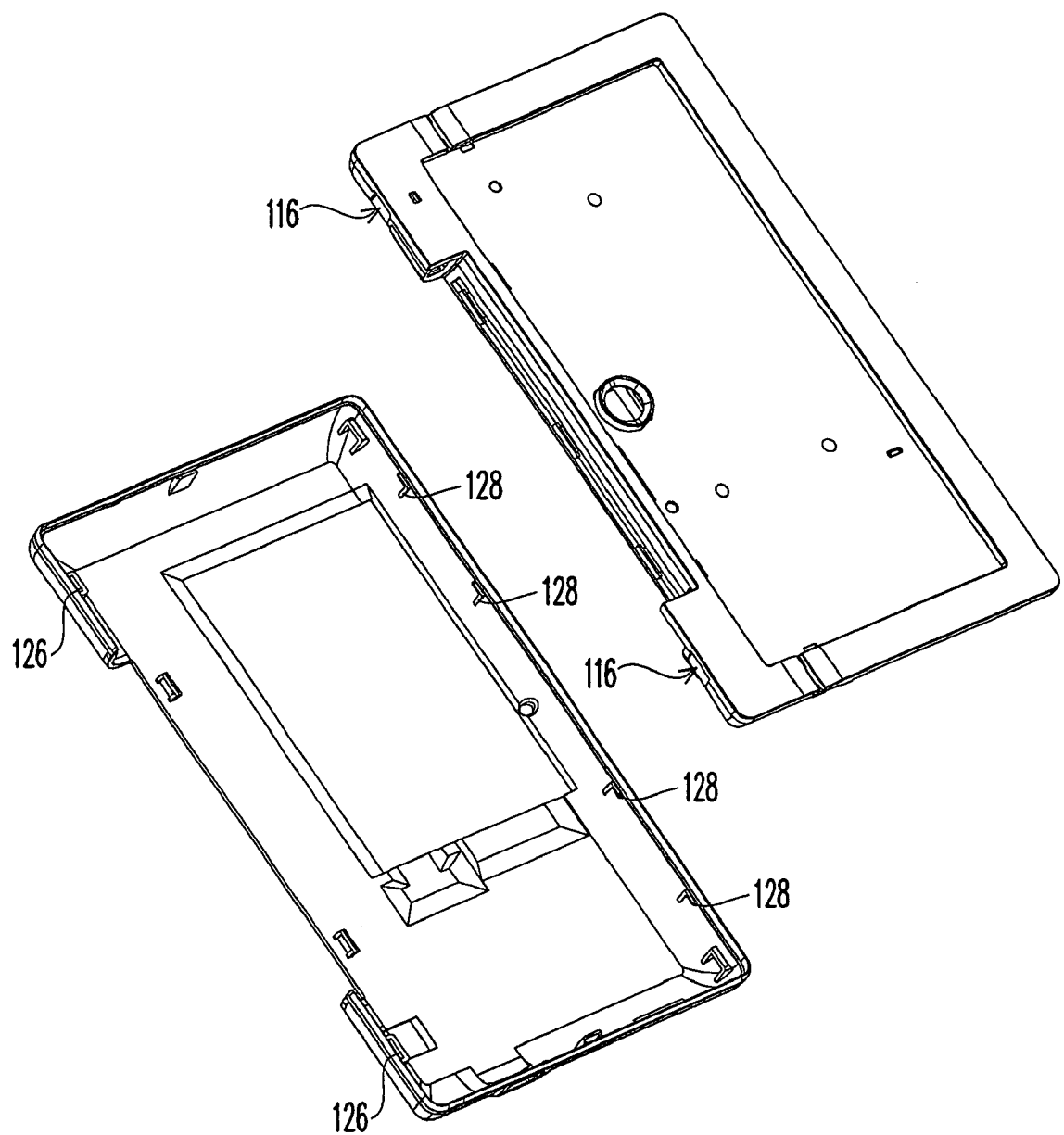
FIG. 3 is a partial perspective back view of the handheld electronic device in FIG. 1.

FIG. 1 is a partial perspective front view of a handheld electronic device according to an embodiment of the present invention, FIG. 2 is an exploded view of the handheld electronic device, and FIG. 3 is a partial perspective back view of the handheld electronic device. In the present embodiment, the engagement structure provided by the present invention is applied to a battery cover of the handheld electronic device. Referring to FIGS. 1~3, the handheld electronic device 100 includes a body 110, a cover 120, an engaging assembly 130, and a releasing member 140.

In the present embodiment, the handheld electronic device 100 may be a bar-type handheld electronic device, and accordingly the body 110 may be integrated with some input interfaces such as a display screen (not shown) and a standard Qwerty-like keyboard (not shown). FIGS. 1~3 illustrate only the back of the body 110 so as to explain the engagement structure of the battery cover clearly, and the other parts of the body 110 should be well-known to those skilled in the art therefore will not be described herein.

However, in other embodiments of the present invention, the handheld electronic device 100 may also be a folding-type or sliding-type handheld electronic device, and accordingly the body 110 may be only a part of the handheld electronic device, namely, an input body with an input interface but without any display interface.

Referring to FIGS. 1~3 again, in the present embodiment, the cover 120 is a battery cover. The cover 120 has a hole 122 and a plurality of locking portions 126 and 128. The engaging assembly 130 includes a first engaging rod 132 and a second engaging rod 134 disposed at one side of the body 110, and the engaging assembly 130 is movably disposed between the body 110 and the cover 120 for engaging the cover 120 on the body 110. To be specific, the body 110 has a slot 116 at one side, wherein the slot 116 can be locked with the locking portions 126 of the cover 120. The body 110 also has a sliding slot 112 at the other side, and the first engaging rod 132 and the second engaging rod 134 are disposed in the sliding slot 112. The first engaging rod 132 and the second engaging rod 134 respectively have a clasp 132a and a clasp 134a for clasping the locking portions 128 at the other side of the cover 120. Accordingly, the cover 120 can be engaged onto the body 110 through foregoing design.

Additionally, the releasing member 140 is disposed on the body 110 and exposed by the hole 122 of the cover 120. The releasing member 140 is suitable for leaning against the engaging assembly 130 and driving the engaging assembly 130 from an engaging position to a releasing position so as to release the cover 120. In the present embodiment, since the engaging assembly 130 includes the first engaging rod 132 and the second engaging rod 134, the releasing member 140 may be disposed between the first engaging rod 132 and the second engaging rod 134 for driving the first engaging rod 132 and the second engaging rod 134 to move along opposite directions at one side of the body 110. On the other hand, the releasing member 140 may include a pin 142 and a wedge 144, wherein the hole 122 of the cover 120 exposes the pin 142. A user may use a pointed object (not shown) to push the pin 142 through the hole 122 so as to move the wedge 144, wherein the pointed object may be a stylus or a clip. The wedge 144 leans against the first supporting surface 132b of the first engaging rod 132 and the second supporting surface 134b of the second engaging rod 134. When the wedge 144 moves towards the body 110, the first engaging rod 132 and the second engaging rod 134 are pushed by the wedge 144 and move correspondingly.

In order to allow the first engaging rod 132, the second engaging rod 134, and the releasing member 140 to restore their original positions, in the present embodiment, a first elastic member 152, a second elastic member 154, and a third elastic member 156 are disposed respectively between the first engaging rod 132 and the body 110, between the second engaging rod 134 and the body 110, and between the releasing member 140 and the body 110. As shown in FIGS. 1 and 2, the first elastic member 152, the second elastic member 154, and the third elastic member 156 may be helical springs which allow the first engaging rod 132, the second engaging rod 134, and the releasing member 140 to restore their original positions by supplying appropriate elastic powers within elasticity ranges thereof.

Figure 4:
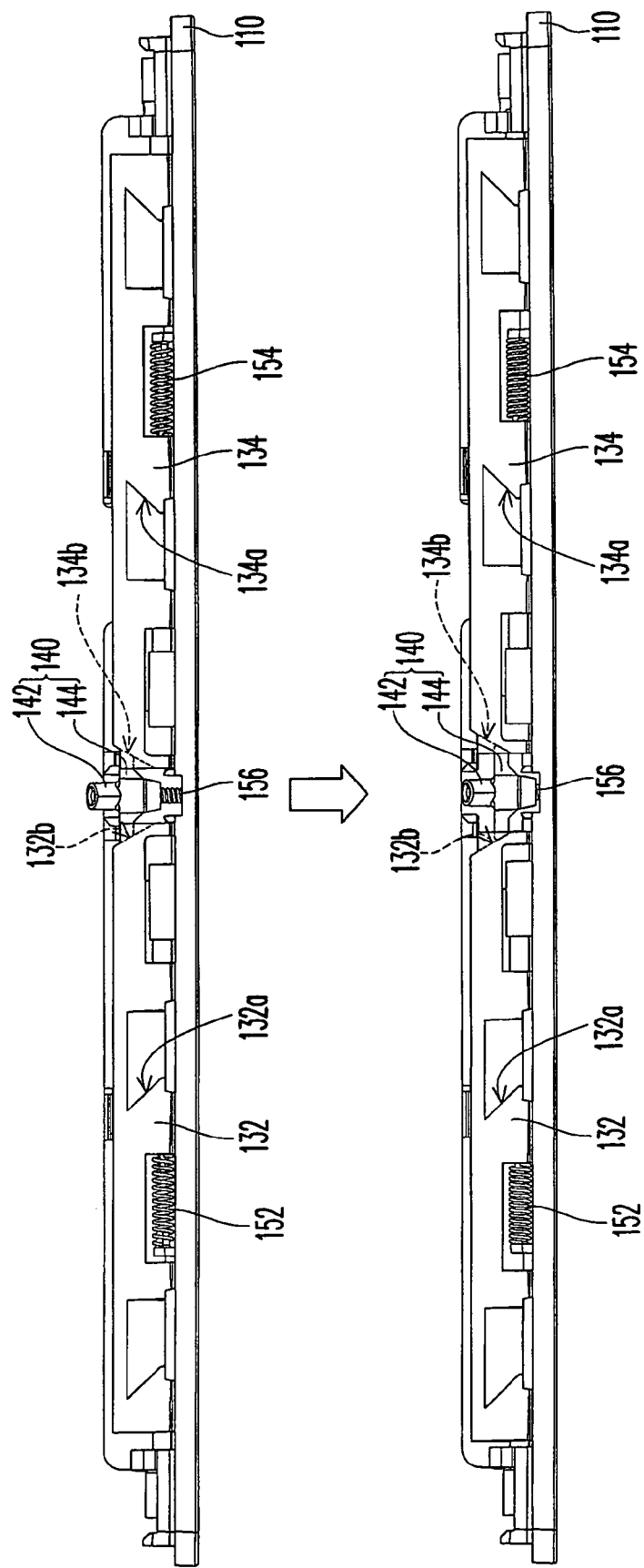
FIG. 4 illustrates the interaction within the engagement structure in FIGS. 1~3.

FIG. 4 illustrates the interaction within the engagement structure in FIGS. 1~3. The cover 120 (as illustrated in FIG. 2) is not shown in FIG. 4 in order to explain the connections between the first engaging rod 132, the second engaging rod 134, and the releasing member 140 clearly. As shown in FIG. 4, when the cover 120 is engaged to the body 110, the first engaging rod 132 and the second engaging rod 134 are respectively located at the engaging position so as to produce structural interference through the clasps 132a and 134a and the locking portions 128 of the cover 120 and to engage the cover 120 onto the body 110.

Thereafter, when the pin 142 of the releasing member 140 is pressed down through the hole 122 on the cover 120 (as illustrated in FIGS. 2 and 3), the wedge 144 of the releasing member 140 leans against the first supporting surface 132b of the first engaging rod 132 and the second supporting surface 134b of the second engaging rod 134 (as illustrated in FIG. 2) and drives the first engaging rod 132 and the second engaging rod 134 to move along opposite directions at one side of the body 110 and reach the releasing position. Accordingly, the clasps 132a and 134a on the first engaging rod 132 and the second engaging rod 134 are released from the locking portions 128 of the cover 120 and accordingly the engagement to the cover 120 is also released and the cover 120 can be removed from the body 110.

Besides, in order to remove the cover 120 from the body 110 more conveniently, in the present embodiment, another elastic member (not shown) may be further disposed between the body 110 and the cover 120 so that the body 110 and the cover 120 can be separated by the elastic member after the first engaging rod 132 and the second engaging rod 134 have released the engagement to the cover 120. The type and disposition of this elastic member may adopt those of an existing design. As shown in FIG. 2, in the present embodiment, a leaf spring 158 is disposed on the body 110. However, the present invention is not limited thereto, and those skilled in the art should be able to apply an existing design into the present embodiment based on foregoing descriptions.

In overview, the engagement structure provided by the present invention offers precise interaction between various members of a handheld electronic device so that the operation handle for disassembling and assembling the handheld electronic device is improved and the operation for disassembling and assembling the handheld electronic device is simplified. Moreover, since only simple members are adopted and abrasion between these members is reduced, the reliability of the engagement structure is improved and accordingly the lift of the handheld electronic device is prolonged. Furthermore, the engagement structure provided by the present invention won't affect the appearance of the handheld electronic device so that the design of the product can be improved. Battery exchange can be made very convenient if the present invention is applied to a battery cover of a handheld electronic device.

It will be apparent to those skilled in the-art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A handheld electronic device, comprising:
   a body;
   a cover, disposed on the body, and the cover having a hole;
   an engaging assembly, movably disposed between the body and the cover for engaging the cover on the body, wherein the engaging assembly comprises a first engaging rod and a second engaging rod disposed at one side of the body, and the releasing member is located between the first engaging rod and the second engaging rod for driving the first engaging rod and the second engaging rod to move along opposite directions in a single dimension; and
   a releasing member, disposed on the body and exposed by the hole of the cover, the releasing member being suitable for leaning against the engaging assembly, wherein the first engaging rod and the second engaging rod respectively have a first supporting surface and a second supporting surface corresponding to the releasing member, the releasing member comprises a wedge for leaning against the first supporting surface and the second supporting surface, and a pointed object is suitable for pressing the releasing member through the hole so that the releasing member drives the first engaging rod and the second engaging rod of the engaging assembly moving oppositely from an engaging position to a releasing position to release the cover.

2. The handheld electronic device according to claim 1 further comprising:
   a first elastic member, disposed between the first engaging rod and the body, the first elastic member allowing the first engaging rod to move back and forth along one side of the body; and
   a second elastic member, disposed between the second engaging rod and the body, the second elastic member allowing the second engaging rod to move back and forth along one side of the body.

3. The handheld electronic device according to claim 2, wherein the first elastic member and the second elastic member are respectively a helical spring.

4. The handheld electronic device according to claim 1 further comprising a third elastic member disposed between the releasing member and the body.

5. The handheld electronic device according to claim 4, wherein the third elastic member is a helical spring.

6. The handheld electronic device according to claim 1, wherein the releasing member comprises a pin and a wedge, the hole of the cover exposes the pin, and the pointed object is suitable for pressing the pin through the hole so that the wedge drives the first engaging rod and the second engaging rod of the engaging assembly from the engaging position to the releasing position to release the cover.

7. The handheld electronic device according to claim 1 further comprising a fourth elastic member disposed between the body and the cover so that the body and the cover can be separated by the fourth elastic member after the engaging assembly releases the cover.

8. The handheld electronic device according to claim 7, wherein the fourth elastic member is a leaf spring.

* * * * *